(12) United States Patent
Baker et al.

(10) Patent No.: US 12,139,061 B2
(45) Date of Patent: Nov. 12, 2024

(54) LIGHT SYSTEMS FOR VEHICLES

(71) Applicant: Rivian IP Holdings, LLC, Irvine, CA (US)

(72) Inventors: Simon Baker, Basingstoke (GB); Shammika Ashan Wickramasinghe, Banbury (GB); Priyank Kumar, Ypsilanti, MI (US); Saili Dilip Jagtap, White Lake, MI (US); Tim Beaven, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/187,598

(22) Filed: Mar. 21, 2023

(65) Prior Publication Data

US 2024/0317131 A1   Sep. 26, 2024

(51) Int. Cl.
| | |
|---|---|
| *G01J 1/42* | (2006.01) |
| *B60Q 1/02* | (2006.01) |
| *F21S 41/125* | (2018.01) |
| *F21S 41/13* | (2018.01) |
| *F21V 29/83* | (2015.01) |
| *G07C 5/08* | (2006.01) |

(52) U.S. Cl.
CPC ............. *B60Q 1/02* (2013.01); *F21S 41/125* (2018.01); *F21S 41/13* (2018.01); *F21V 29/83* (2015.01); *B60Q 2300/33* (2013.01)

(58) Field of Classification Search
CPC ..... B60Q 1/02; B60Q 2300/33; F21S 41/125; F21S 41/13; F21V 29/83
See application file for complete search history.

(56) References Cited

U.S. PATENT DOCUMENTS

| | | | | |
|---|---|---|---|---|
| 7,862,216 B2* | 1/2011 | Friedrichs | ............. | F21S 41/151 |
| | | | | 362/547 |
| 2002/0154515 A1* | 10/2002 | Yagi | ......................... | B60Q 1/14 |
| | | | | 362/539 |
| 2015/0124466 A1* | 5/2015 | Kushimoto | ........... | F21S 41/176 |
| | | | | 362/466 |
| 2019/0384054 A1* | 12/2019 | Mukojima | ............... | F21S 41/13 |
| 2020/0158308 A1* | 5/2020 | Kitazawa | ................ | F21S 41/62 |
| 2020/0294401 A1* | 9/2020 | Kerecsen | ............. | G05D 1/0287 |
| 2020/0333182 A1* | 10/2020 | Ahmed | ................ | G01J 1/4257 |
| 2021/0291723 A1* | 9/2021 | Kusumoto | ............ | H05B 47/105 |
| 2023/0391250 A1* | 12/2023 | Hsu | ........................ | B60Q 1/143 |

* cited by examiner

*Primary Examiner* — Tracie Y Green

(74) *Attorney, Agent, or Firm* — BAKERHOSTETLER

(57) ABSTRACT

Aspects of the disclosure relate to light output that can include light that is outside the visible spectrum to enhance a driver's awareness of the environment. Such light can be output, and reflections thereof can be captured to perform object detection. Outputs can be provided by a display or other output device of the vehicle to supplement and enhance the view of the environment. Such light output and detection can be provided with or in the absence of light that is within the visible spectrum, thereby allowing the driver and/or an autonomous system to avoid excessive reflection of visible light. Aspects of the disclosure can help to improve illumination by a vehicle and provide additional outputs to help a driver and/or an autonomous system safely operate the vehicle.

19 Claims, 13 Drawing Sheets

LIGHT SYSTEMS FOR VEHICLES

INTRODUCTION

Vehicles often include light output systems to illuminate the surrounding environment and to improve the view thereof. Such lights can be provided with different characteristics and/or modes of operation to provide different illumination types for a variety of scenarios.

Aspects of the subject technology can help to improve illumination by a vehicle and provide additional outputs to help safely operate the vehicle.

SUMMARY

The present description relates generally to light output, including, for example, light output for vehicles. One or more implementations of the disclosure relate to light output that can include light that is outside the visible spectrum to enhance a driver's awareness of the environment and improve detections by the vehicle. Such light can be output, and reflections thereof can be captured to perform object detection. Outputs can be provided by a display or other output device of the vehicle to supplement and enhance the driver's view of the environment. Such light output and detection can be provided with or in the absence of light that is within the visible spectrum, thereby allowing the driver to avoid excessive reflection of visible light. Aspects of the disclosure can help to improve illumination by a vehicle and provide additional outputs to help a driver and/or an autonomous system safely operate the vehicle.

In accordance with one or more aspects of the disclosure, a component for a movable apparatus can include a first light source configured to produce visible light, a second light source configured to produce infrared light, a heatsink supporting the first light source and the second light source, and a window, wherein the heatsink and the window at least partially enclose the first light source and the second light source. The second light source can produce the infrared light with at least a portion of the infrared light extending outside a beam spread angle of the visible light produced by the first light source. A reflector between the heatsink and the window can be positioned to direct the visible light from the first light source and the infrared light from the second light source. An image sensor can detect a reflection of the visible light or the infrared light, and a display configured to provide an output based on a detection of the reflection.

In accordance with one or more aspects of the disclosure, a component for a movable apparatus can include a light source configured to produce first light with a first beam spread angle, a laser configured to produce second light with a second beam spread angle, less than the first beam spread angle, a heatsink supporting the light source and the laser, and a window, wherein the heatsink and the window at least partially enclose the light source and the laser. The second beam spread angle can be less than 5 degrees. The reflector can be between the heatsink and the window, wherein the reflector is positioned to direct the first light from the light source and the second light from the laser. An image sensor can detect a reflection of the first light or the second light, and a display can provide an output based on a detection of the reflection.

In accordance with one or more aspects of the disclosure, a movable apparatus can include a first light source configured to produce visible light, a second light source configured to produce infrared light, an image sensor configured to detect a reflection of the visible light or the infrared light, and a display configured to provide an output based on a detection of the reflection.

According to some aspects, the image sensor can be operable to detect a range of visibility in a direction in front of the first light source based on the reflection, wherein the second light source and the display are operable based on a detection of the range of visibility. An environmental sensor can be provided for detecting a moisture level in a vicinity of the first light source and the second light source, wherein the second light source and the display are operable based on a detection of the moisture level.

According to some aspects, the movable apparatus is operable in: a first mode with the first light source producing the visible light and the second light source being inactive, and a second mode with the first light source being inactive, the second light source producing the infrared light, and the display providing the output based on the detection of the reflection of the infrared light.

According to some aspects, in the second mode, the image sensor is further operable to detect a location of the movable apparatus with respect to an object reflecting the infrared light, and the movable apparatus is further operable to output a notification based on a detection of the location of the movable apparatus with respect to the object.

According to some aspects, the image sensor can be operable to detect a motion of an object based on the reflection of the infrared light, wherein the movable apparatus is further configured to output a notification based on a detection of the motion. The notification can include operating the first light source to produce the visible light. The notification can include a signal transmitted to an external device in operable communication with the movable apparatus. According to some aspects, the notification can include an audible output produced by a speaker.

According to some aspects, the movable apparatus can be operable in: a first mode with the first light source producing the visible light and the second light source being inactive, and a second mode with the first light source producing the visible light, the second light source producing the infrared light, and the display providing the output based on the detection of the reflection of the infrared light. The image sensor can detect an object based on a detection of the reflection of the infrared light, and the display is configured to provide the output including an indication of the object. The second light source can be produced with at least a portion of the infrared light extending outside a beam spread angle of the visible light.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In many vehicles, light output systems are used to illuminate the surrounding environment and to improve the view thereof. Such lights can be provided with different characteristics and/or modes of operation to provide different illumination types for a variety of scenarios. Under some conditions, light output by vehicle can be reflected back to the driver, which can reduce the quality of the driver's view. For example, excessive reflection can occur under conditions with fog, smoke, and/or dust. In such conditions, it can be beneficial to provide additional guidance for the driver without relying on the primary output of visible light.

Implementations of the subject technology described herein provide light output that includes light that is outside the visible spectrum to enhance a driver's awareness of the environment. Such light can be output, and reflections thereof can be captured to perform object detection. Outputs can be provided by a display or other output device of the vehicle to supplement and enhance the driver's view of the environment. Such light output and detection can be provided with or in the absence of light that is within the visible spectrum, thereby allowing the driver to avoid excessive reflection of visible light.

As described herein, aspects of the subject technology can help to improve illumination by a vehicle and provide additional outputs to help a driver and/or an autonomous system safely operate the vehicle.

Figure 1A:
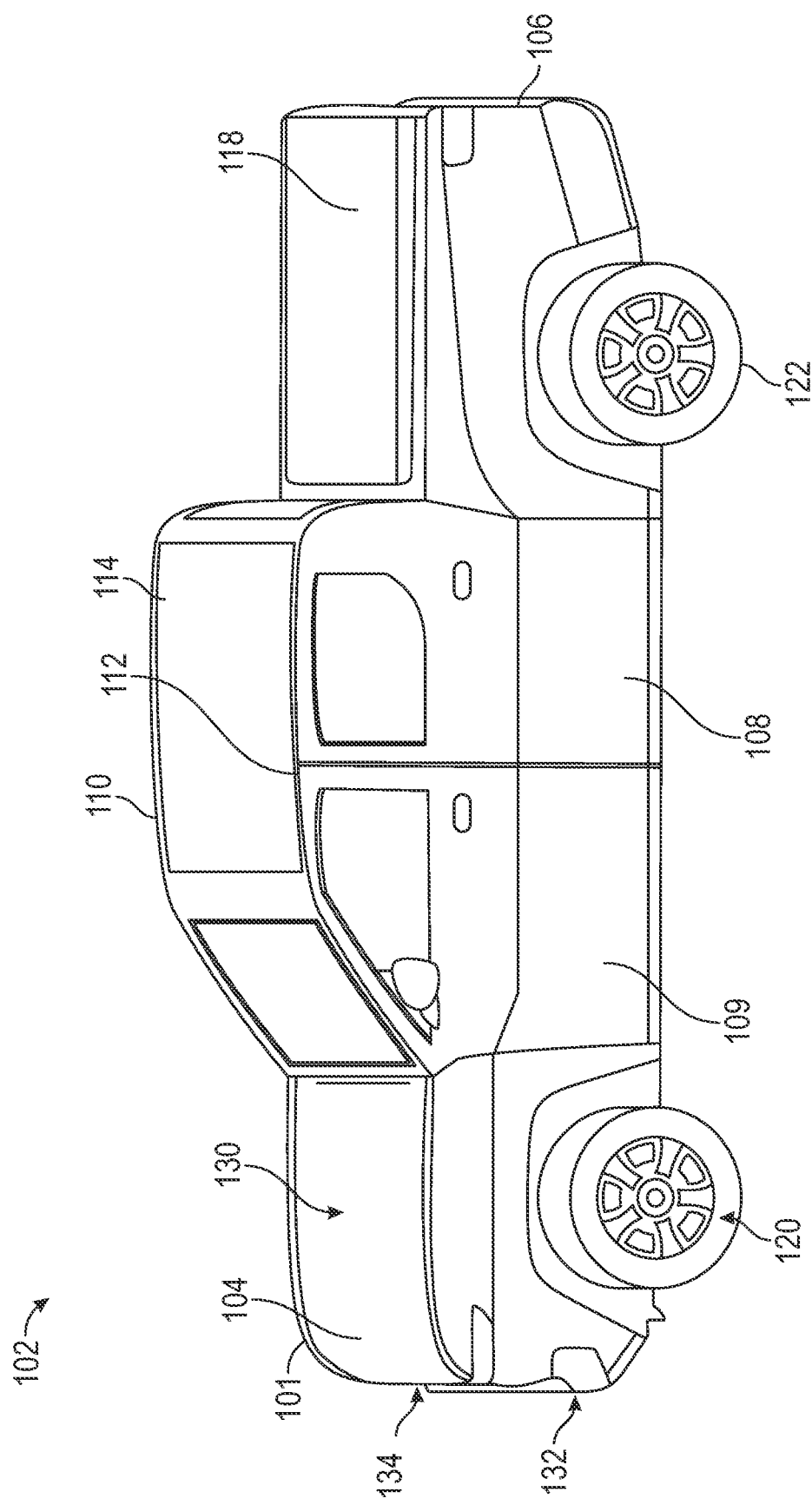
FIGS. 1A and 1B illustrate schematic perspective side views of example implementations of a vehicle in accordance with one or more implementations.

FIG. 1A is a diagram illustrating an example implementation of an apparatus as described herein. In the example of FIG. 1A, an apparatus is implemented as a moveable apparatus, such as a vehicle 102. In one or more implementations, the vehicle 102 may be an electric vehicle having one or more electric motors that drive the wheels of the vehicle. In one or more implementations, the vehicle 102 may also, or alternatively, include one or more chemically-powered engines, such as a gas-powered engine of a fuel cell powered motor. In various implementations, the vehicle 102 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

As shown, the vehicle 102 may have a front portion 104 and a rear portion 106. A cabin 108 may be located between the front portion 104 and the rear portion 106 of the vehicle 102. The cabin 108 may include entry doors 109. As illustrated, the vehicle 102 has a right side 110 and a left side 112.

Vehicle 102 may include a roof 114. Vehicle 102 may have one or more cargo spaces, such as a cargo bed or truck bed 118 (also referred to herein as a "trunk") and/or a front cargo space 130 (also referred to herein as a front trunk or a "frunk"). Cargo bed 118 is typically located at or near the rear portion 106 of the vehicle. Vehicle 102 may have one or more front wheels 120 and one or more rear wheels 122. Vehicle 102 of FIG. 1A may be a unibody truck, which may have a storage bed. One or more portions of a body 101 of the vehicle 102 may be constructed of steel alloy and/or aluminum alloy or other suitable materials.

As shown in the example of FIG. 1A, the body 101 of the vehicle 102 may include one or more front fascia, such as front fascia 132 and/or front fascia 134. For example, the front fascia 132 may be a lower front fascia and the front fascia 134 may be an upper front fascia. As shown, the front fascia 132 and/or front fascia 134 are located at the front end of the vehicle 102. The front fascia 132 and/or front fascia 134 may provide an aesthetic front look for the vehicle 102 and may be arranged to provide external aerodynamic properties for the vehicle 102. In one or more implementations, the front fascia 132 and/or the front fascia 134 may be implemented as removable sections of the front end of the vehicle 102 and may be comprised of plastic or non-metal components (carbon fiber) that hide one or more structural elements (e.g., bodywork/frame) and give the vehicle a desired outer shape. One or more lights can be provided at the front fascia 132 and/or front fascia 134, as described further herein.

Figure 1B:
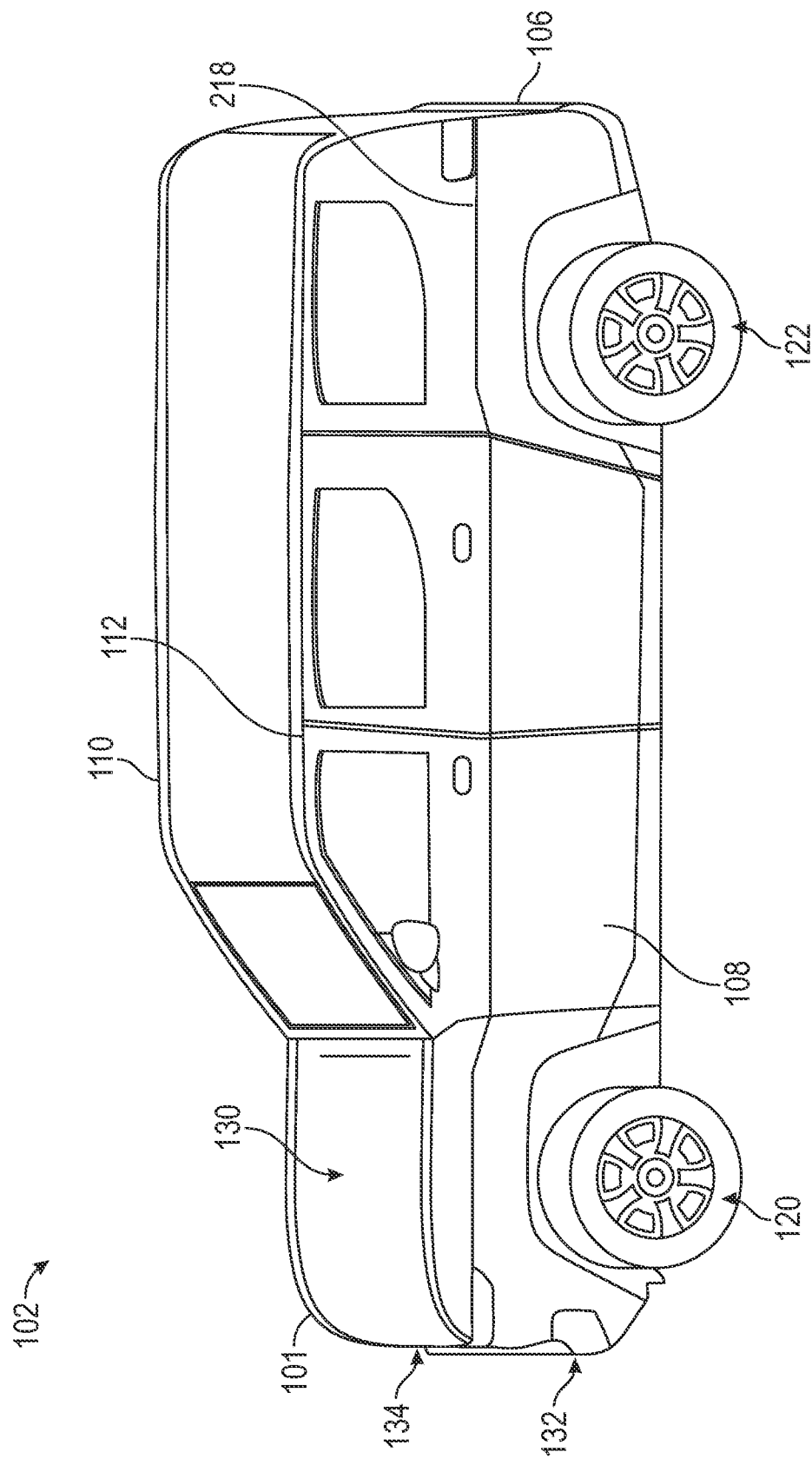

FIG. 1B is a diagram illustrating another example implementation of the vehicle 102. Vehicle 102 in this example may have a rear portion 106 with a rear cargo space (trunk) 218. e.g., behind a row of occupant seating, that may be internal to the rear portion 106. Rear cargo space 218 may be referred to as a trunk or a cargo bed or rear cargo space. FIGS. 1A and 1B, respectively, depict example implementations of the vehicle 102 as a truck and a sport utility vehicle. However, these example implementations are merely illustrative, and the vehicle 102 may be implemented as any type of vehicle or other moveable apparatus (e.g., including, but not limited to, a van, a delivery van, a semi-truck, an aircraft, a watercraft, or the like).

Figure 2:
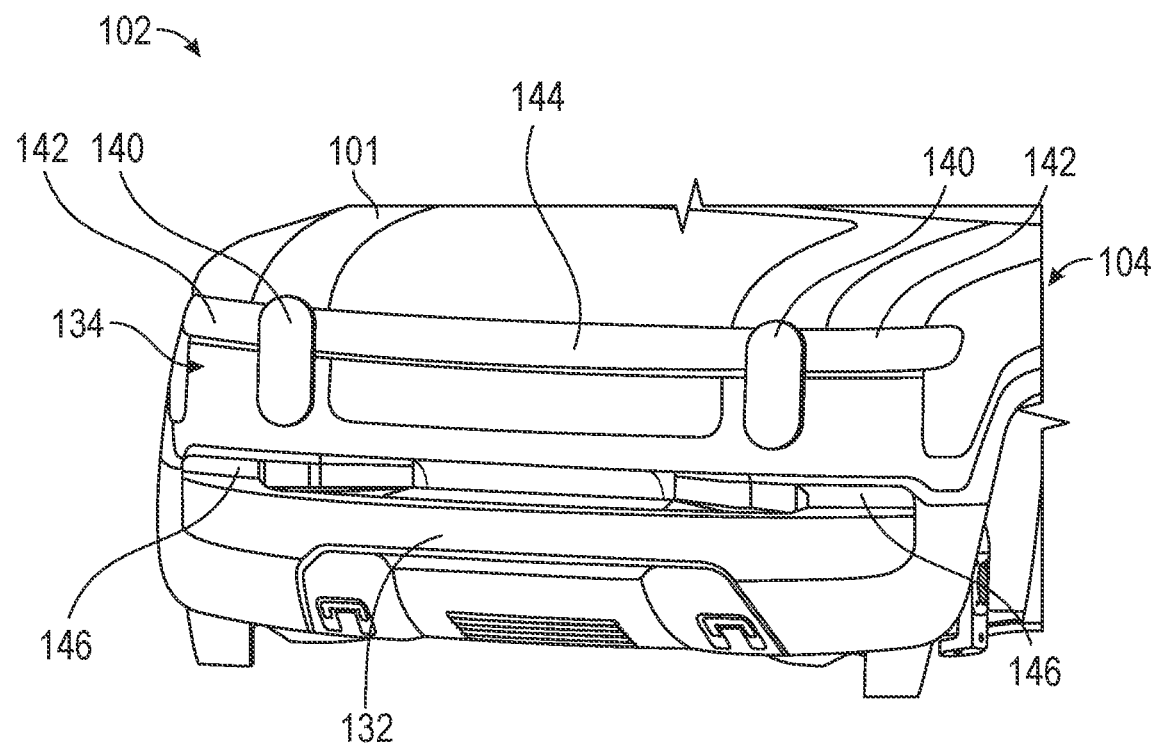
FIG. 2 illustrates a schematic front perspective view of an example implementation of a vehicle in accordance with one or more implementations.

FIG. 2 illustrates a front perspective view of the front portion 104 of the vehicle 102 in accordance with one or more implementations. As shown in FIG. 2, the vehicle 102 may include the body 101 with the front fascia 132 and front fascia 134, and may include one or more light components 140, light components 142, and/or light components 144 at the front fascia 134 (e.g., upper front fascia). As shown in FIG. 2, at least some of the lights, such as light components 140 can optionally have a particular shape, such as at least partially rounded and/or oblong (e.g., lozenge-shaped). As further shown in FIG. 2, at least some of the lights, such as light components 144 and light components 142 can extend between and/or beyond the sides of the light components 140. The light components 140, light components 142, and/or light components 144 can be configured to output beams of light that have the same or different characteristics, such as intensity, color (e.g., frequency or wavelength), direction, range, and/or beam width.

As further shown in FIG. 2, the vehicle 102 may include one or more light components 146 at the front fascia 132 (e.g., lower front fascia). As shown in FIG. 2, the light components 146 can be placed at a location that is below one or more of the light components 140, light components 142, and/or light components 144 at the front fascia 132. For example, such a location can be advantageous to provide fog light illumination from the vehicle, whereas the locations of the light components 140, light components 142, and/or light components 144 at the front fascia 134 can be advantageous to provide high beam illumination. By further example, the light components 146 and/or the light components 142 can be positioned at lateral (i.e., left and right) sides of the front portion 104 of the vehicle 102. Such a location can be advantageous to provide one or more beams of light illuminated in a direction towards a corresponding lateral (i.e., left or right) side of the vehicle 102. For example, such beams of light can be provided or increased.

Additionally or alternatively, the features of a light component 146 can be provided by or combined with any one of the light components 140, light components 142, and/or light components 144. For example, the features described herein with respect to any one of the light components 140, light components 142, light components 144, and/or light components 146 can be applied to any other one of the light components 140, light components 142, light components 144, and/or light components 146. As such, such light output features can be provided at or from any location of the front portion 104 of the vehicle 102. Additionally or alternatively, the features described herein with respect to any one of the light components 140, light components 142, light components 144, and/or light components 146 can be applied to portions of the vehicle other than the front portion 104 of the vehicle 102. For example, such light output features can be provided at the right side 110, the left side 112, the rear portion 106, and/or the roof 114 of the vehicle 102.

It will be understood that each of the light components 140, light components 142, light components 144, and/or light components 146 can be operated independently and/or in concert. For example, where a particular type of light or a type of combined light is desired, one or more of the light components can optionally be operated simultaneously to provide such light from different locations. By further example, at any given time, fewer than all of the light components can be operated, while one or more other light components can remain inactive. By further example, different types of light output can be provided by controllably operating one or more of the light components in one mode of operation while one or more other light component(s) are active in a different mode of operation. In some embodiments, certain light sources (e.g., outputting IR light) can be operated independently and/or simultaneously with other light sources (e.g., outputting visible light). In some embodiments, of light sources outputting visible light can be operated with or without light sources outputting IR light.

Figure 3:
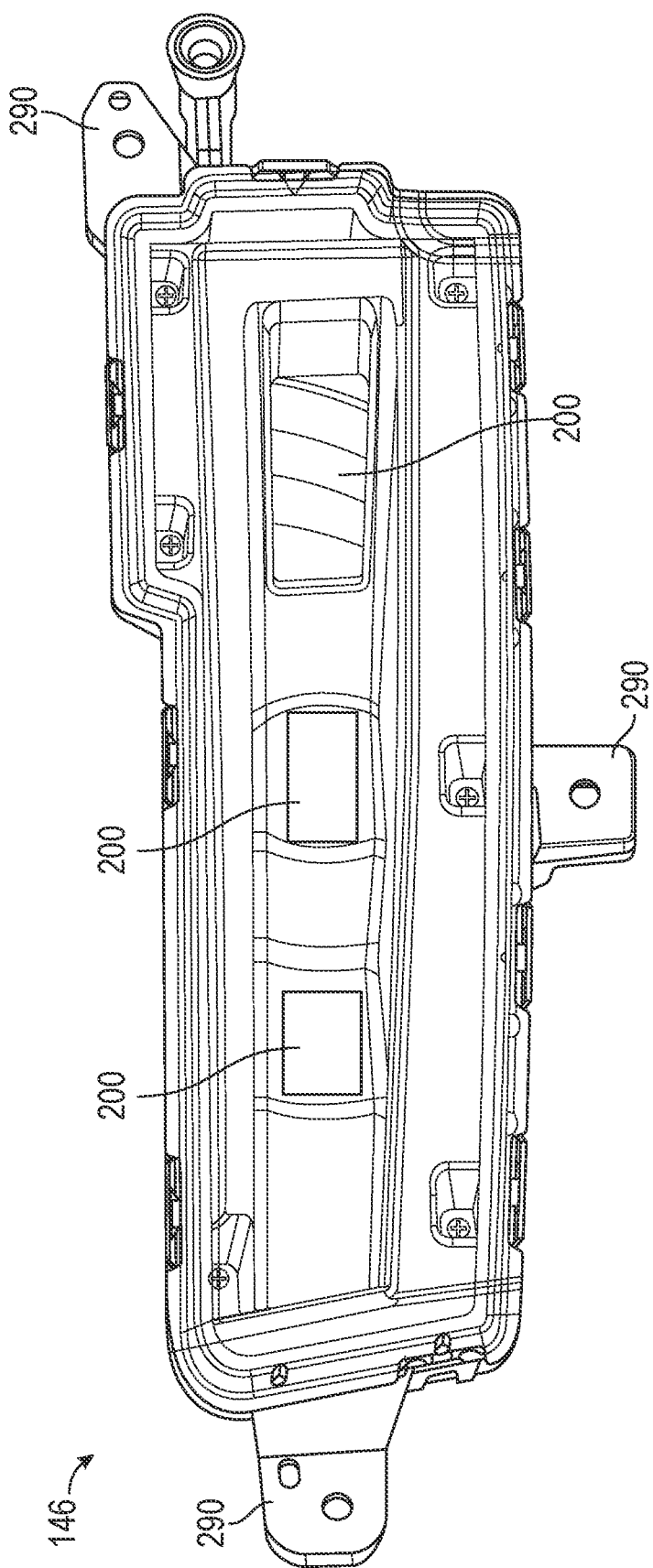
FIG. 3 illustrates a front view of a component for outputting light from a vehicle, in accordance with implementations of the subject technology.

FIG. 3 illustrates a front view of a light component 146 for outputting light from a vehicle, in accordance with implementations of the subject technology. While the light component 146 is shown as corresponding to the light component 146 at the front fascia 132 (e.g., lower front fascia) of FIG. 2, it will be understood that a light component having the features of the light component 146 described herein can be provided at any location on the vehicle 102 of FIG. 2. For example, one or more light modules 200 of the light component 146 of FIG. 3 can be provided at any one or more of the light components 140, light components 142, and/or light components 144 at the front fascia 134 (e.g., upper front fascia). By further example, one or more light modules 200 of the light component 146 of FIG. 3 can be provided at the rear portion 106 of the vehicle 102, such as at or near a taillight of the vehicle 102. By further example, one or more light modules 200 of the light component 146 of FIG. 3 can be provided at the right side 110, the left side 112, the roof 114 and/or another portion of the vehicle 102.

As shown in FIG. 3, the light component 146 can include one or more supports 290 for securely coupling the light component 146 to another portion of the vehicle, such as the front fascia. Such a support can include structure including or configured to engage with fasteners, screws, magnets, pins, locks, latches, and the like. The light component 146 can include one or more light modules 200. Each light module 200 can include one or more light sources, as described further herein. Accordingly, a given light component 146 can be selected for a vehicle based on the desired light output characteristics. The selected light component 146 can be one that includes light modules 200 that provide the desired light output characteristics. It will be understood that any given light component 146 can be exchanged with other light components 146 as desired.

Figure 4:
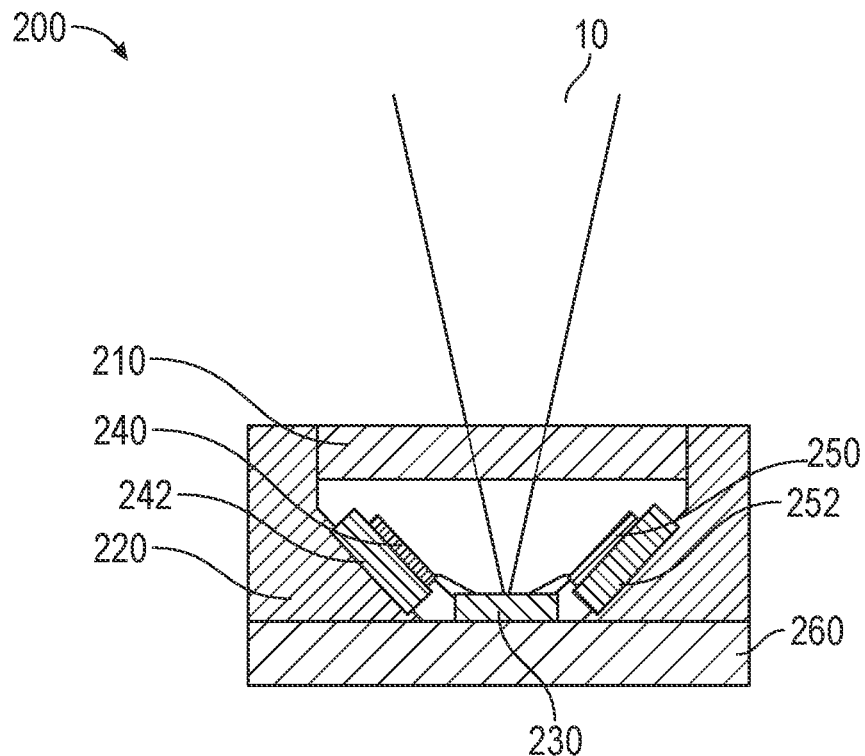
FIG. 4 illustrates a cross-sectional view of a portion of a component for outputting light from a vehicle, in accordance with implementations of the subject technology.

FIG. 4 illustrates a cross-sectional view of a portion of a light module 200 for outputting light from a vehicle, in accordance with implementations of the subject technology. As shown in FIG. 4, the light module 200 can include multiple light sources, such as a first light source 240 and a second light source 250. In some embodiments, the first light source 240 can provide a light beam that is different from a light beam provided by the second light source 250. For example, the first light source 240 can be operated to produce light within the visible spectrum (e.g., visible light), and the second light source 250 can be operated to produce light outside the visible spectrum (e.g., infrared light). It will be understood that the first light source 240 and the second light source 250 can be operated simultaneously or at different times (e.g., in different modes), as described further herein. The light sources can be one or more of a variety of types of light sources. For example, each light source can be or include an LED light bulb, a laser (e.g., laser diode, semiconductor laser, etc.), an incandescent light bulb, a fluorescent light bulb, and the like. It will be understood that the light module 200 can include any number of light sources, which can be operated to provide beams of light that are the same or different than other beams of light from other light sources, as described further herein.

As shown in FIG. 4, the light module 200 can further include a housing 260 with a heatsink 220 for dissipating heat away from the light sources. For example, the first light source 240 can be coupled to the heatsink 220 by a mount 242, and the second light source 250 can be coupled to the heatsink 220 by a mount 252. The light module 200 can further include a window 210 for transmitting beams of light there through. The housing 260, the heatsink 220 and/or the window 210 can define a space in which the light sources are enclosed.

In some embodiments, as shown in FIG. 4, each of the first light source 240 and the second light source 250 can be arranged to direct their corresponding beams of light toward a reflector 230. The reflector 230 can be arranged to reflect the incoming beams of light through the window 210 of the light module 200. Additionally or alternatively, one or more light sources of the light module 200 can be arranged to emit a beam of light through the window 210 without reflection off the reflector 230.

It will be understood that the light module 200 and/or the corresponding light component can include one or more other optical components to shape and/or direct beams of light. Such optical components can include one or more reflectors, lenses, diffraction gratings, and the like. Such optical components can be included within the light module 200 or positioned elsewhere at a light component supporting the light module 200.

Figure 5:
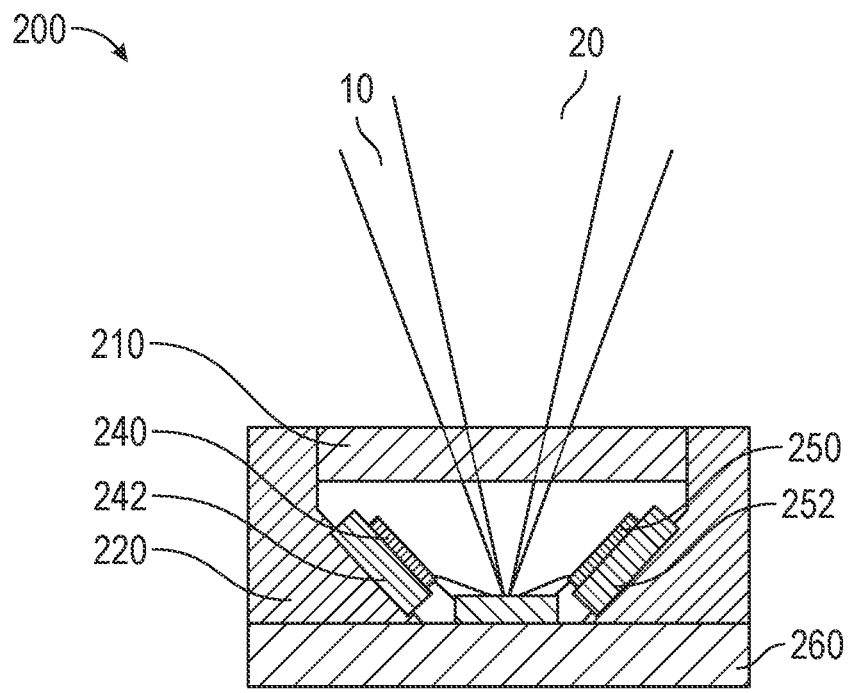
FIG. 5 illustrates a cross-sectional view of the portion of a component for outputting light from a vehicle, in accordance with implementations of the subject technology.

FIG. 5 illustrates a cross-sectional view of the portion of a light module 200 for outputting light from a vehicle, in accordance with implementations of the subject technology.

As shown in FIG. 5, the beam of light 10 provided by the first light source 240 can be different than the beam of light 20 provided by the second light source 250. In some embodiments, a beam spread angle of the first beam of light 10 can be different than a beam spread angle of the second beam of light 20. For example, the beam spread angle 12 of the first beam of light 10 can be greater than or equal to 10, 20, 30, 40, 50, 60, 70, 80, or 90 degrees. By further example, the beam spread angle 22 of the second beam of light 20 can be less than or equal to 2, 3, 4, 5, 6, 7, 8, 9, 10, 20, 30, or 40 degrees.

In some embodiments, a direction of the first beam of light 10 can be different than a direction of the second beam of light 20. In some embodiments, a color (e.g., frequency or wavelength) of the first beam of light 10 can be different than a direction of the second beam of light 20. For example, the first light source 240 can be operated to produce light within the visible spectrum (e.g., visible light), and the second light source 250 can be operated to produce light outside the visible spectrum (e.g., infrared light). In some embodiments, an intensity of the first beam of light 10 can be different than a direction of the second beam of light 20. In some embodiments, a range of the first beam of light 10 can be different than a direction of the second beam of light 20. While both the first light 10 and the second light 20 are shown in FIG. 5, it will be understood that the first light source 240 and the second light source 250 can be operated simultaneously or at different times (e.g., in different modes), as described further herein.

Figure 6:
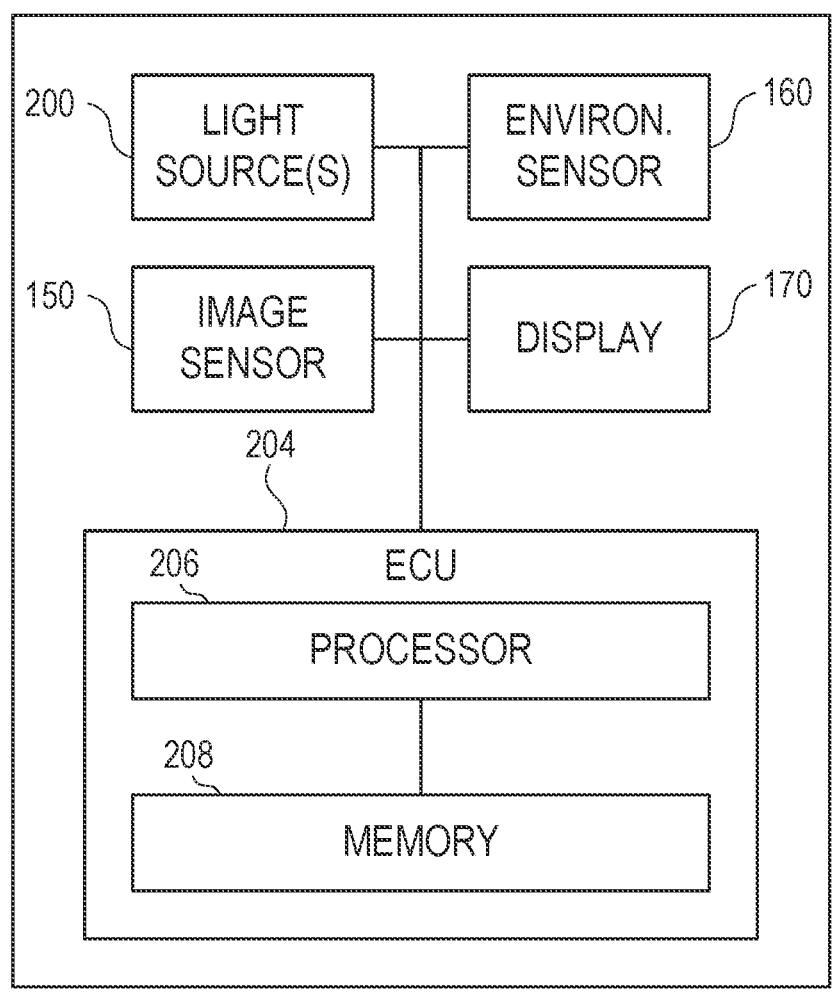
FIG. 6 illustrates a block diagram of an example vehicle configured to output light, in accordance with one or more implementations of the subject technology.

FIG. 6 illustrates a block diagram of an example vehicle 102 configured to output light, in accordance with one or more implementations of the subject technology. Not all of the depicted components may be used in all implementations, however, and one or more implementations may include additional or different components than those shown in the figure.

Variations in the arrangement and type of the components may be made without departing from the spirit or scope of the claims as set forth herein. Additional components, different components, or fewer components may be provided.

The vehicle 102 may include one or more electronic control units (ECU) 204, one or more image sensors 150, one or more environmental sensors, and/or one or more displays 170. The ECU 204 may include a processor 206 and a memory 208. In one or more implementations, the vehicle 102 may include a processor 206 and/or a memory 208 separate from the ECU 204. For example, the vehicle 102 may not include the ECU 204 and may include the processor 206 as a part or all of a separate semiconductor device. In one or more implementations, vehicle 102 may include multiple ECUs 204 that each control particular functionality of the vehicle 102.

The processor 206 may include suitable logic, circuitry, and/or code that enables processing data and/or controlling operations of the vehicle 102. In this regard, the processor 206 may be enabled to provide control signals to various other components of the vehicle 102, such as for example, the one or more image sensors 150, the one or more environmental sensors, and/or the one or more displays 170. The processor 206 may also control transfers of data between various portions of the vehicle 102. The processor 206 may further implement an operating system, such as a real-time operating system, or may otherwise execute code to manage operations of the vehicle 102. The memory 208 may include suitable logic, circuitry, and/or code that enable storage of various types of information. The memory 208 may include, for example, random access memory (RAM), read-only memory (ROM), flash, and/or magnetic storage.

The image sensor 150 may be included in one or more cameras, such as an onboard camera, dashcam, event camera, infrared camera, video camera, or any other type of device that captures digital representations of a physical environment. The cameras may be used to capture images for detecting and/or recognizing people and/or objects. For example, images captured by the image sensor 150 may be used to recognize obstacles in a pathway of the vehicle 102. Such images can be reflections of light emitted from the vehicle 102, including light within the visible spectrum and/or light outside the visible spectrum. By further example, the image sensor 150 can be configured to detect a reflectivity of objects and/or particulates in a vicinity of the vehicle 102. Such reflectivity can be a basis for determining which light to output (e.g., to minimize reflection to the driver).

The environmental sensor 160 can be operated to detect one or more conditions in a vicinity of the vehicle 102. For example, the environmental sensor 160 can be configured to detect a moisture level in a vicinity of the vehicle 102 and/or its components. By further example, the environmental sensor 160 can be configured to detect a moisture level in a vicinity of the vehicle 102 and/or its components. By further example, the environmental sensor 160 can be configured to detect a particulate and/or a characteristic thereof in a vicinity of the vehicle 102 and/or its components. Such a detection can include a detection of smoke, fog, and/or dust. The presence of smoke, fog, and/or dust can limit the range of visibility for the driver and/or one or more sensors of the vehicle 102. As such, a range of visibility can be inferred from the detected presence of smoke, fog, and/or dust. Such detected conditions can be a basis for determining which light to output (e.g., to minimize reflection to the driver).

Figure 7:
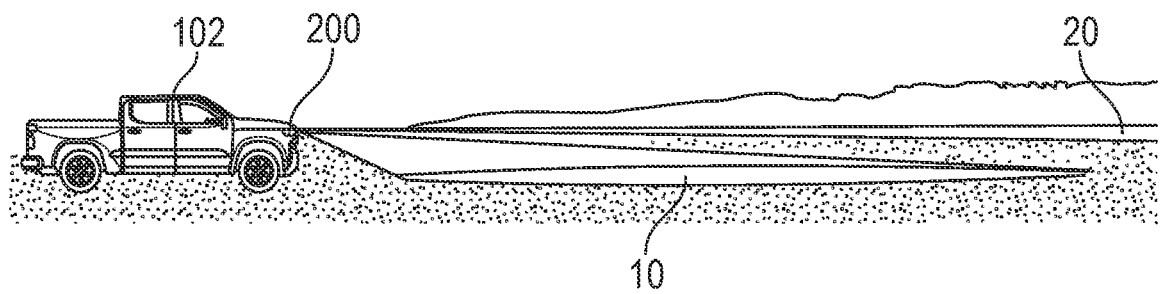
FIG. 7 illustrates a view of a vehicle providing multiple light outputs, in accordance with implementations of the subject technology.
Figure 8:
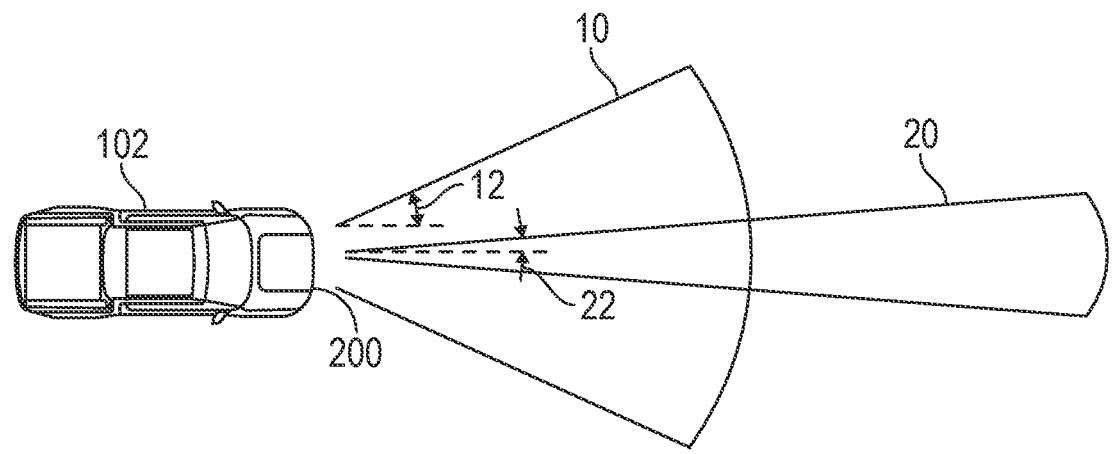
FIG. 8 illustrates a top view of the vehicle of FIG. 7 providing multiple light outputs, in accordance with implementations of the subject technology.

Referring now to FIGS. 7 and 8, multiple beams of light can be provided simultaneously to illuminate particular regions in front of a vehicle 102. FIG. 7 illustrates a view of a vehicle 102 providing multiple light outputs, in accordance with implementations of the subject technology. As shown in FIG. 7, a first light 10 can be provided by a light module 200 at a relatively low angle, such that the light 10 is cast on a portion of the ground in front of the vehicle 102. A second light 20 can be provided by the light module 200 and/or another light source at a relatively high angle, such that the light 20 is cast above and/or beyond the ground in front of the vehicle 102. The light 20 can be operated as a high beam light to illuminate objects above the ground. As such, the light 20 can provide a high beam boost to extend the range of illumination that would otherwise be provided. For example, the light 20 can be provided as a high beam light or as a supplement to another high beam light. In some embodiments, both the light 10 and the light 20 can be visible light that illuminates objects for viewing by the driver.

FIG. 8 illustrates a top view of the vehicle of FIG. 7 providing multiple light outputs, in accordance with implementations of the subject technology. As shown in FIG. 8, the light 10 and the light 20 can have different being spread angles. For example, the light 10 can have a relatively wide beam spread angle 12 for illuminating a wide range within a vicinity of the vehicle 102. By further example, the light 20 can have a relatively narrow beam spread angle 22, less than the beam spread angle 12 of the first light. The narrow beam spread angle 22 can be directed to a greater distance in front of the vehicle 102 for illuminating objects farther away than those illuminated by the first light 10. As such objects are farther away from the vehicle 102, it can be desirable to focus the light on those that are directly in front of the vehicle 102. Where the first light 10 is both higher and narrower than the second light 20 (which is lower and wider), the first light 10 can illuminate a broader range that is closer to the vehicle 102, and the second light 20 can illuminate a narrow range that is farther away from the vehicle 102.

It will be understood that the light module 200 and/or other light sources can be operated to produce the second light 20 with other high beam modes. For example, the second light 20 can be provided when the user or an automated system of the vehicle 102 selects a mode in which high beam lights are to be output. As such, the light module 200 can operate in concert with one or more other light sources of the vehicle 102 to provide light output in a high beam mode. Such a mode can be disabled, for example, when a corresponding user input is received and/or when another vehicle in front of the vehicle 102 is detected (e.g., by detecting its light output with the image sensors of the vehicle 102).

To provide light with different characteristics, the light module 200 and/or other light sources can have different features to output each of the light 10 and the light 20. In some embodiments, the light 10 can be provided by a light source such as the first light source 240 of FIG. 4 or FIG. 5. In some embodiments, the light 20 can be provided by a light source such as the second light source 250 of FIG. 5. As such, the light 10 and the light 20 can have different characteristics to provide different illumination in the vicinity of the vehicle 102. For example, the light 10 can be from an LED, incandescent, and/or fluorescent light source. By further example, the light 20 can be from a laser (e.g., laser diode, semiconductor laser, etc.) light source. Where the light 20 is provided by a laser, the light 10 can provide a laser boost to extend the range of illumination that would otherwise be provided. This can be particularly beneficial in off-road travel, in which distant terrain can be better illuminated to assist with navigation. Such range of illumination can, for example, exceed 600 m and up to 1 km or beyond, particularly in off-road environments. It will be understood that such output types are optionally, and an arrangement of optical components can shape a beam of light from any of a variety of sources to have the characteristics described herein. The light 20 can provide a greater range of visibility within a narrower beam spread angle than does the light 10. As such, the light 10 can be operated in a high beam mode of the vehicle 102, which can optionally be combined with other types of illumination, such as other high beam lights, low beam lights, and/or fog lights when such other modes are determined to be appropriate (e.g., based on user input and/or detections).

Figure 9:
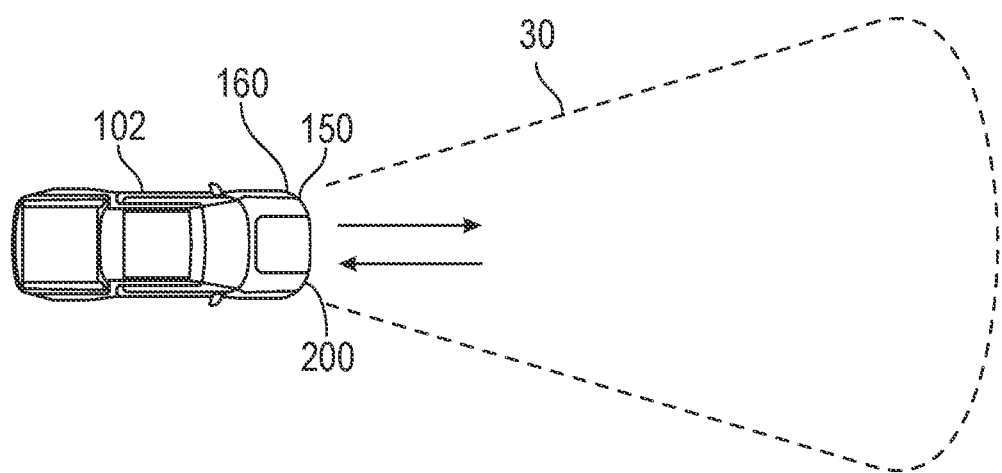
FIG. 9 illustrates a top view of a vehicle providing light output and detecting reflections, in accordance with implementations of the subject technology.
Figure 10:
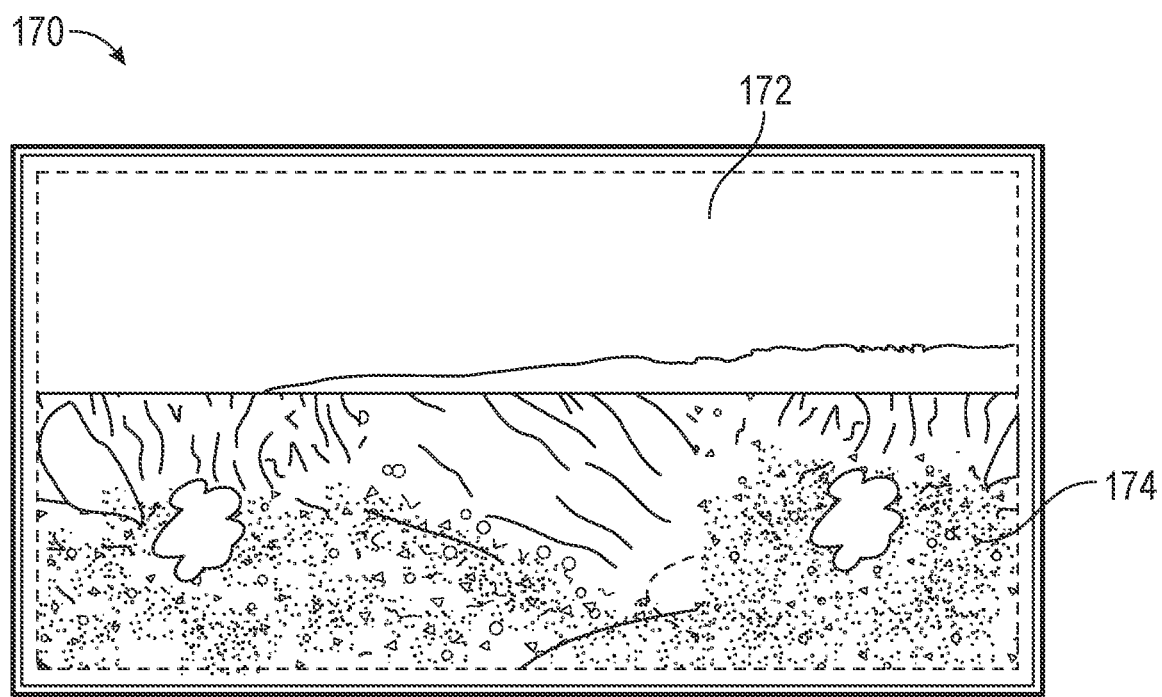
FIG. 10 illustrates a display with a user interface, in accordance with implementations of the subject technology.

Referring now to FIGS. 9 and 10, light 30 outside the visible spectrum can be output and reflected to detect images of an environment in front of the vehicle 102, which can be provided on a display 170 of the vehicle 102. FIG. 9 illustrates a top view of a vehicle providing light output and detecting reflections, in accordance with implementations of the subject technology. The light 30 can be output by the light module 200 and/or another light source. In some embodiments, the light 30 can include light that is outside of the visible spectrum (e.g., infrared light). The light 30 can be reflected off one or more objects in a vicinity of the vehicle 102, and such reflections can be detected by the image sensor 150 of the vehicle 102. As such, the light 20 can provide a stargazing mode in which visibility of the terrain is provided via a display of the vehicle without excessively illuminating the terrain with visible light and reflections thereof. As such, other features, such as the night sky, can be more readily seen.

In some embodiments, the vehicle 102 can provide a mode of operation in which only light 30 that is outside of the visible spectrum is output. In such a mode, light that is within the visible spectrum can be omitted. This can be desirable when the conditions are such that outputting visible light can create excessive reflections off objects and/or particulates in the vicinity of the vehicle 102. Such conditions can include excessive fog, smoke, and/or dust in front of the vehicle 102, for example when driving off-road. The presence of smoke, fog, and/or dust can limit the range of visibility for the driver and/or one or more sensors of the vehicle 102. As such, a range of visibility with a particular type of light can be inferred from the detected presence of smoke, fog, and/or dust, and an alternate type of light can be selected to improve visibility (e.g., reduce reflections off the objects and/or particulates in the vicinity of the vehicle 102). The detection of smoke, fog, and/or dust can be based on operation of a sensor of the vehicle 102, such as a depth sensor, LIDAR, UWB sensor, and the like. Additionally or alternatively, the detection of smoke, fog, and/or dust can be based on operation of an image sensor of the vehicle 102, for example by detecting an amount of reflection that occurs with operation of certain light sources. Where certain light sources (e.g., outputting visible light) produce excessive reflections, such reflections can be detected, and a different light source can be selected to produce fewer reflections (e.g., within the visible spectrum).

In some embodiments, the vehicle 102 can provide the light and omit light that is within the visible spectrum based on a mode of operation selected by a driver. For example, the driver may not want to excessively illuminate the environment, such as when approaching a location or person who would not want to have the visible light illuminating them. For example, at night such illumination may be undesirable to the target of such illumination. Accordingly, the driver of the vehicle 102 may manually select a mode in which only light 30 that is outside of the visible spectrum is output.

Additionally or alternatively, the vehicle 102 may automatically select a mode in which only light 30 that is outside of the visible spectrum is output. Such a selection can be based on a detection of conditions, such as excessive reflections (e.g., by the image sensor 150) and/or excessive fog, smoke, and/or dust in front of the vehicle 102 (e.g., by the environmental sensor 160). As such, the detected range of visibility can be inferred and used as a basis for operating one or more light sources.

FIG. 10 illustrates a display with a user interface, in accordance with implementations of the subject technology. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

Where the light 30 is outside of the visible spectrum, such light and reflections thereof may not be perceptible to the driver. As such, the display 170 of the vehicle 102 can provide a user interface 172 that outputs the view captured by the image sensor 150, for example a view 174 in front of the vehicle 102. It will be understood that the output of the display can be with light that is within the visible spectrum, even while such an output is based on a detection of reflected light that is outside the visible spectrum. For example, the display 170 and/or a control unit can convert the detected images into an output that is visible to the driver.

It will be understood that, while no visible light is being output by the vehicle 102, a direct view of the environment (e.g., through a windshield of the vehicle 102) may be limited. Accordingly, the driver can observe the vicinity through the user interface 172 of the display 170. As such, the view provided to the driver can be enhanced by the output of the display 170 without illuminating the environment with visible light and/or creating excessive reflections. Optionally, the driver can navigate by observation of the display 170. Accordingly, the light 30 can be provided in the absence of another type of illumination (e.g., of light within the visible spectrum). As such, the light 30 can be operated in a mode of the vehicle 102 in which other types of light are omitted, such as low beam lights, high beam lights and/or fog lights. Such other types of light can be provided in another mode when determined to be appropriate (e.g., based on user input and/or detections). In some embodiments, the light 30 can be provided by a light source have features such as those described with respect to light 20 of FIGS. 7 and 8. For example, the light 30 can be from an LED, incandescent, and/or fluorescent light source. By further example, the light 30 can be from a laser (e.g., laser diode, semiconductor laser, etc.) light source. Where such light is provided outside the visible spectrum (e.g., infrared light), such light can scatter less than white or other light that is within the visible spectrum. Accordingly, the reflections off of fog, smoke, and/or dust can be minimized, and reflections off of other objects (e.g., terrain) can be maintained or enhanced.

In some embodiments, light output and detections can be performed for monitoring and security. For example, the vehicle 102 can output light 30 while stationary (e.g., parked). The light 30 can be output without being perceived by others, such as by being outside the visible spectrum. This provides the advantages of not disrupting the activities of others and not notifying others of the presence of the light. The image sensor 150 can detect reflections of the light 30 and the vehicle can perform image processing and/or other analysis to detect objects, motion, and the like. The vehicle 102 can perform further actions, such as recording images, activating an alarm, and/or sending a notification. For example, the notification can be an alarm provided as an audible sound generated by a speaker of the vehicle 102. By further example, the notification can include a signal to an electronic device that activity has been detected. Accordingly, the light output and detection can be provided for monitoring and security of the vehicle 102 while the vehicle 102 is not in motion.

It will be understood that the operations described herein with respect to FIGS. 9 and 10 can be combined with one or more other operations described herein. For example, the detections and outputs performed as described herein with respect to FIGS. 9 and 10 can be performed while one or more detections and outputs are performed as described herein with respect to FIGS. 7 and 8. It will be further understood that one or more modes of operations can be active in response to a detection made in another mode. For example, the detections and outputs performed as described herein with respect to FIGS. 9 and 10 can be used to determine that one or more other operations are to be performed, such as those described herein with respect to FIGS. 7 and 8.

Figure 11:
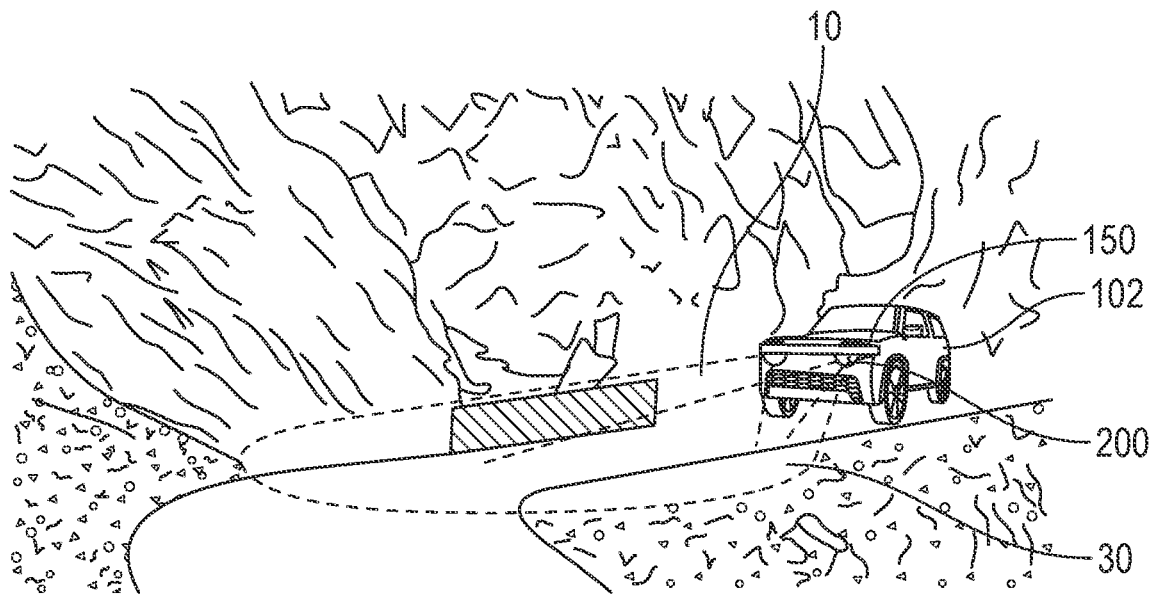
FIG. 11 illustrates a perspective view of a vehicle providing light outputs and detecting reflections, in accordance with implementations of the subject technology.
Figure 12:
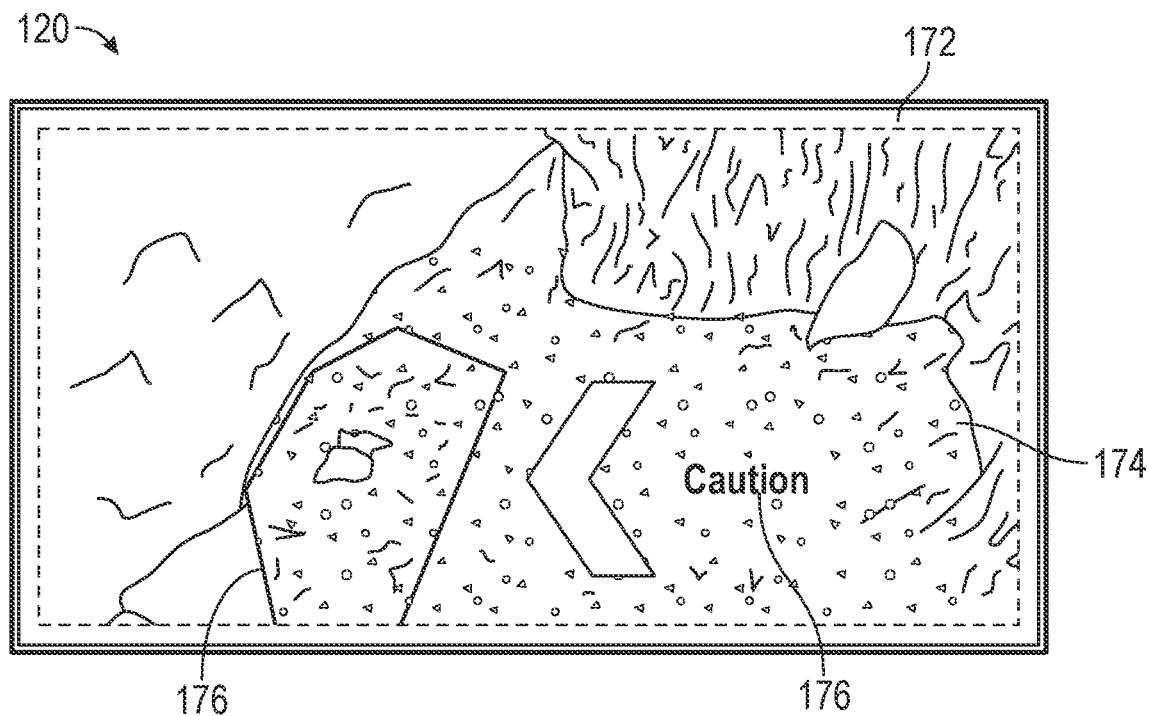
FIG. 12 illustrates a display with a user interface, in accordance with implementations of the subject technology.

Referring now to FIGS. 11 and 12, various types of light can be output and reflected to detect objects in front of the vehicle 102, which can be provided on a display 170 of the vehicle 102. FIG. 11 illustrates a perspective view of a vehicle providing light outputs and detecting reflections, in accordance with implementations of the subject technology. A light module 200 and/or another light source can output light 10 and/or light 30. In some embodiments, the light 10 can include light that is within the visible spectrum, and the light 30 can include light that is outside of the visible spectrum (e.g., infrared light). The light 10 can be provided from low beam lights, high beam lights, fog lights, and/or the like. In some embodiments, the light 10 can be provided by a light source such as the first light source 240 of FIG. 4 or FIG. 5. In some embodiments, the light 30 can be provided by a light source such as the second light source 250 of FIG. 5. As such, the light 10 and the light 20 can have different characteristics to provide different illumination in the vicinity of the vehicle 102. The light 10 can be reflected off one or more objects in a vicinity of the vehicle 102, and such reflections can be directly observed by the driver of the vehicle 102. The light 30 can be reflected off one or more objects in a vicinity of the vehicle 102, and such reflections can be detected by the image sensor 150 of the vehicle 102. In some embodiments, the vehicle 102 can provide a mode of operation in which only light 30 that is outside of the visible spectrum is output. In such a mode, light that is within the visible spectrum can optionally be omitted. Such a mode can be manually or automatically selected.

FIG. 12 illustrates a display with a user interface, in accordance with implementations of the subject technology.

Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

In some embodiments, the light 30 can have one or more characteristics that is different than the light 10. The light 30 can be cast onto regions of the environment that are not intended to be illuminated with visible light 10 for direct observation by the driver. For example, the light 30 can be provided in a direction that is different than a direction of the light 10. By further example, the light 30 can be provided with a beam spread angle that is different (e.g., greater or less) than a beam spread angle of the light 10. Accordingly, the light 30 can provide a broader beam spread angle than does the light 10. As such, the light 10 and/or the light 30 can be operated in a low beam mode of the vehicle 102, which can optionally be combined with other types of illumination, such as high beam lights and/or fog lights when such other modes are determined to be appropriate (e.g., based on user input and/or detections).

Where the light 30 is outside of the visible spectrum, such light and reflections thereof may not be perceptible to the driver. As such, the display 170 of the vehicle 102 can provide a user interface 172 that outputs the view 174 captured by the image sensor 150. It will be understood that the output of the display 170 can be with light that is within the visible spectrum, even while such an output is based on a detection of reflected light that is outside the visible spectrum. For example, the display 170 and/or a control unit can convert the detected images into an output that is visible to the driver.

In some embodiments, detections by the image sensor 150 can provide a basis for further outputs. For example, the image sensor 150 can detect reflected light (e.g., from light 30) and perform object detection and/or object recognition via image processing. Additionally or alternatively, such detections can be performed by one or more other sensors, such as a depth sensor, LIDAR, UWB sensor, and the like. The detections can include, for example, a presence or other characteristic of an object in a vicinity of the vehicle 102. Such an object can be determined to be of interest to the driver. For example, the object can be in a projected pathway of the vehicle 102 or otherwise present a hazard to the driver and/or the vehicle 102. Based on such detections and determinations, the user interface 172 of the display 170 can output other visual elements 176, such as annotations, notifications, and/or warnings. The visual elements 176 can include icons, text, highlighting, animations, and the like. Such features can be provided with respect to an object or other item of interest. The driver can be made aware of the presence or other characteristic of the object via the user interface 172 of the display 170.

It will be understood that the view 174 provided by the user interface 172 of the display 170 need not be based on the light 10. Rather, the light 30, which can be outside the visible spectrum, can be provided for detections by the image sensor 150 and outputs by the display 170, whereas the light 10 can be provided for illumination within the visible spectrum for direction observation by the driver. In at least one mode, where no light 10 (within the visible spectrum) is provided, the light 30 (outside the visible spectrum) can still be provided, with corresponding detections and outputs performed as described herein.

In some embodiments, the vehicle 102 can perform one or more other actions in response to detections and/or determinations based on projected light 30. For example, the vehicle 102 can perform autonomous driving tasks (e.g.,) steering, braking, and/or acceleration to avoid a detected object. By further example, when not in a fully autonomous mode, the vehicle 102 can perform a driver assist function, such as automatic steering, braking, and/or acceleration to avoid a detected object. By further example, the vehicle 102 can perform another safety function, such as notifications to the driver and/or others in a vicinity of the vehicle 102. By further example, the vehicle 102 can activate one or more light sources to illuminate an environment (e.g., including an object) outside the vehicle 102 upon detection thereof.

It will be understood that the operations described herein with respect to FIGS. 11 and 12 can be combined with one or more other operations described herein. For example, the detections and outputs performed as described herein with respect to FIGS. 11 and 12 can be performed while one or more detections and outputs are performed as described herein with respect to FIGS. 7 and 8 and/or while one or more other detections and outputs are performed as described herein with respect to FIGS. 9 and 10. It will be further understood that one or more modes of operations can be active in response to a detection made in another mode. For example, the detections and outputs performed as described herein with respect to FIGS. 11 and 12 can be used to determine that one or more other operations are to be performed, such as those described herein with respect to FIGS. 7 and 8 and/or those described herein with respect to FIGS. 9 and 10.

Figure 13:
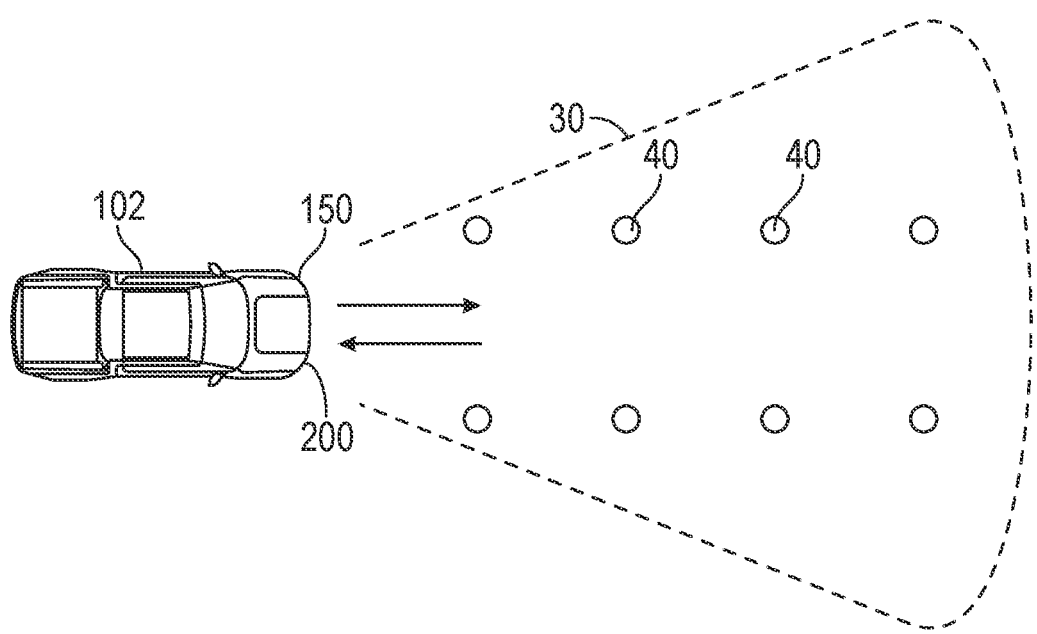
FIG. 13 illustrates a top view of a vehicle providing light output and detecting reflections, in accordance with implementations of the subject technology.
Figure 14:
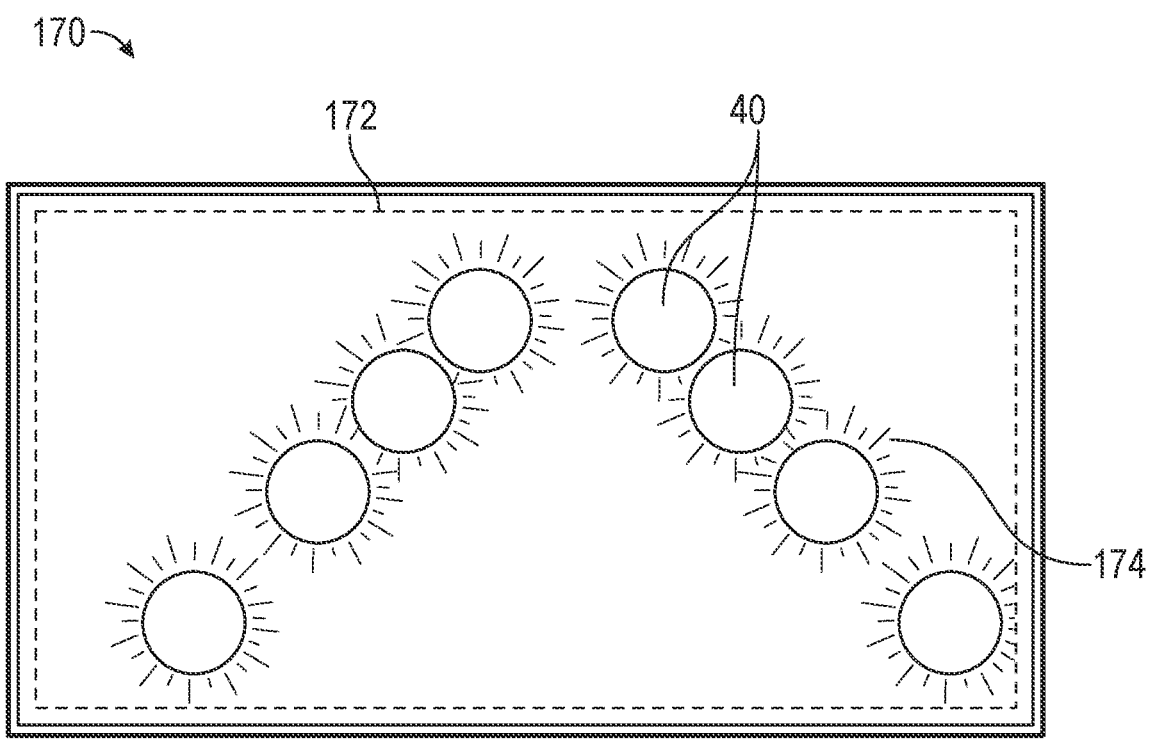
FIG. 14 illustrates a display with a user interface, in accordance with implementations of the subject technology.

Referring now to FIGS. 13 and 14, light 30 outside the visible spectrum can be output and reflected to detect objects in front of the vehicle 102, which can be provided on a display 170 of the vehicle 102. FIG. 13 illustrates a top view of a vehicle providing light output and detecting reflections, in accordance with implementations of the subject technology. The light 30 can be output by the light module 200 and/or another light source. In some embodiments, the light 30 can include light that is outside of the visible spectrum (e.g., infrared light). The light 30 can be reflected off one or more reflectors 40 in a vicinity of the vehicle 102, and such reflections can be detected by the image sensor 150 of the vehicle 102. The reflectors 40 can be placed along a pathway or otherwise arranged to provide indications to a driver. The reflectors 40 can be configured to reflect light from a particular direction and/or in a particular direction.

In some embodiments, the vehicle 102 can provide a mode of operation in which only light 30 that is outside of the visible spectrum is output. In such a mode, light that is within the visible spectrum can be omitted. Such a mode can be manually or automatically selected.

In some embodiments, the vehicle 102 can provide a mode of operation in which light 30 that is outside of the visible spectrum is output along with other light, such as light within the visible spectrum. In such a mode, both types of light can be provided, and the driver can directly observe the illuminated environment while the vehicle detects the reflectors.

FIG. 14 illustrates a display with a user interface, in accordance with implementations of the subject technology. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

Where the light 30 is outside of the visible spectrum, such light and reflections thereof may not be perceptible to the driver. As such, the display 170 of the vehicle 102 can provide a user interface 172 that outputs the view 174 captured by the image sensor 150, for example the reflectors 40 in front of the vehicle 102. It will be understood that the output of the display 170 can be with light that is within the visible spectrum, even while such an output is based on a detection of reflected light that is outside the visible spectrum. For example, the display 170 and/or a control unit can convert the detected images into an output that is visible to the driver. The view 174 output on the user interface 172 can include the reflectors 40. It will be understood that, in a mode in which no visible light is being output by the vehicle 102, a direct view of the reflectors 40 (e.g., through a windshield of the vehicle 102) may be limited. Accordingly, the driver can directly observe the vicinity without prominent reflection from the reflectors 40. However, the driver can also observe the view 174 on the user interface 172 of the display 170 to observe the reflectors 40. As such, the view provided to the driver can be supplemented by the output of the display 170 without causing the direct view of the reflectors to be prominent to the driver upon direct observation (e.g., through the windshield). The use of light outside the visible spectrum can facilitate guidance of a driver and/or the vehicle 102 while also providing benefits described herein with respect to other modes of operation, such as the stargazing mode. Accordingly, the vehicle 102 can provide a view of the terrain and/or the reflectors 40 via the display of the vehicle without excessively illuminating the terrain with visible light and reflections thereof. As such, other features, such as the night sky, can be more readily seen.

It will be understood that the operations described herein with respect to FIGS. 13 and 14 can be combined with one or more other operations described herein. For example, the detections and outputs performed as described herein with respect to FIGS. 13 and 14 can be performed while one or more detections and outputs are performed as described herein with respect to FIGS. 7 and 8, while one or more other detections and outputs are performed as described herein with respect to FIGS. 9 and 10, and/or while one or more other detections and outputs are performed as described herein with respect to FIGS. 11 and 12. It will be further understood that one or more modes of operations can be active in response to a detection made in another mode. For example, the detections and outputs performed as described herein with respect to FIGS. 13 and 14 can be used to determine that one or more other operations are to be performed, such as those described herein with respect to FIGS. 7 and 8, those described herein with respect to FIGS. 9 and 10, and/or those described herein with respect to FIGS. 11 and 12.

Figure 15:
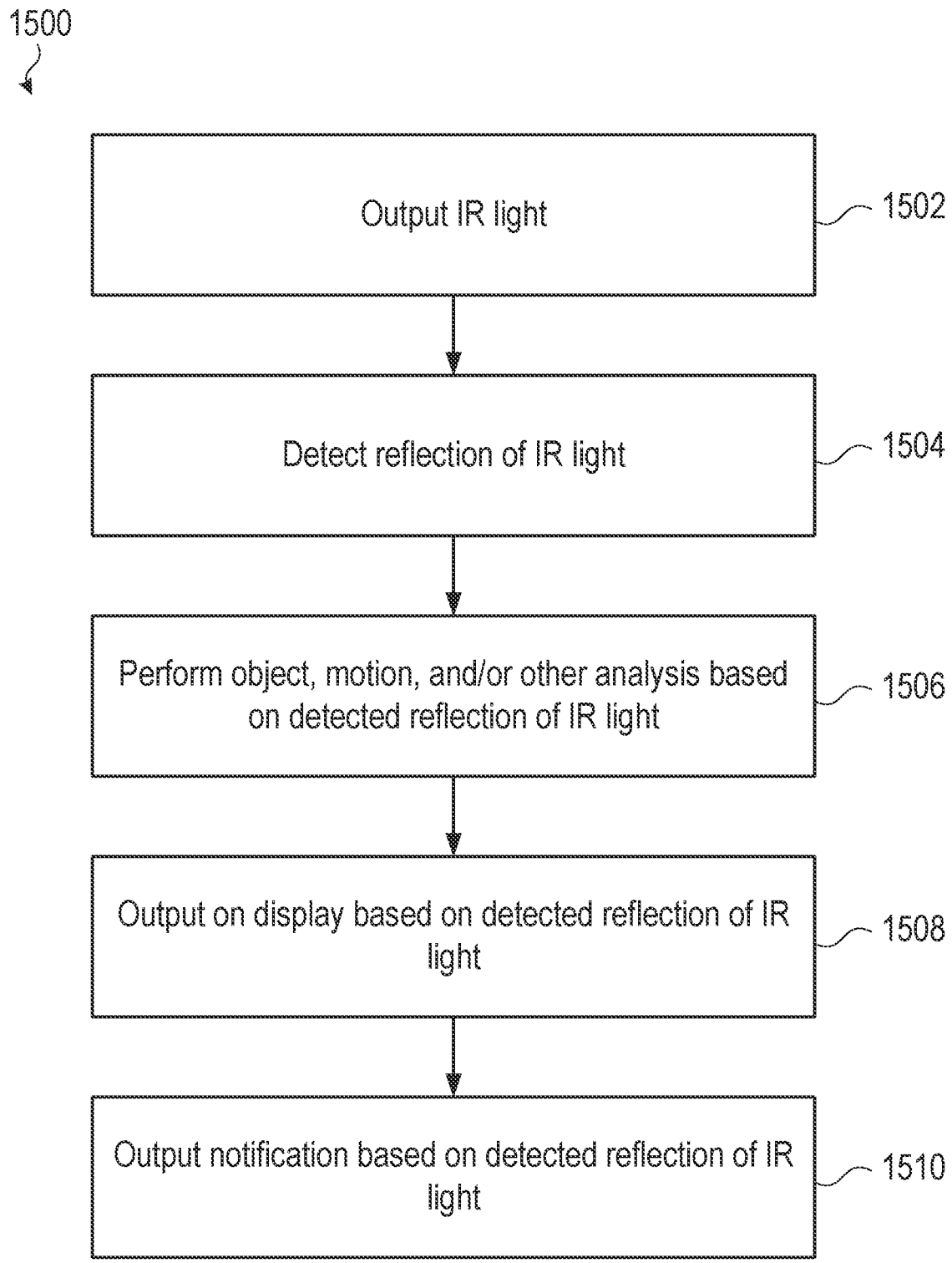
FIG. 15 illustrates a flow chart of example operations that may be performed by a light system of a vehicle in accordance with implementations of the subject technology.

FIG. 15 illustrates a flow diagram of an example process 1500 that may be performed by a light output system of a vehicle, in accordance with implementations of the subject technology. For explanatory purposes, the process 1500 is primarily described herein with reference to the vehicle 102 and components thereof as shown in FIGS. 1-14. However, the process 1500 is not limited to the vehicle 102 of FIGS. 1-14, and one or more blocks (or operations) of the process 1500 may be performed by one or more other components of other suitable apparatuses, devices, or systems. Further for explanatory purposes, some of the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

As illustrated in FIG. 15, at block 1502, a light output system (e.g., ECU 204) of a vehicle (e.g., vehicle 102) may output light. The light can be outside the visible spectrum, such as infrared light. Additionally or alternatively, light within the visible spectrum can be output. Non-limiting examples of such outputs are illustrated in FIGS. 4-5, 7-9, 11, and 13, which can optionally be combined to be performed simultaneously and/or in sequence as described herein.

At block 1504, a reflection of the infrared light can be detected. Such a detection can be performed by one or more image sensors of the vehicle.

At block 1506, the light output system can perform object, motion, and/or other analysis based on the detection of the reflected light. For example, image processing can be performed on the detections performed by the one or more image sensors of the vehicle. Such processing can include conversion of the detected infrared light to one or more images to be output by a display with light that is within the visible spectrum.

At block 1508, the light output system can provide an output on a display. The output can be part of a user interface and be based on the detection of the reflected light. For example, the output can include a view captured by the one or more image sensors of the vehicle. Non-limiting examples of such outputs are illustrated in FIGS. 10, 12, and 14.

At block 1510, the light output system can output one or more notifications based on the detection of the reflected light. For example, such notifications can include outputs other than the view captured by the one or more image sensors of the vehicle. By further example, the notifications can include an indication of an object of interest, such as an object that is within a projected pathway of the vehicle.

Figure 16:
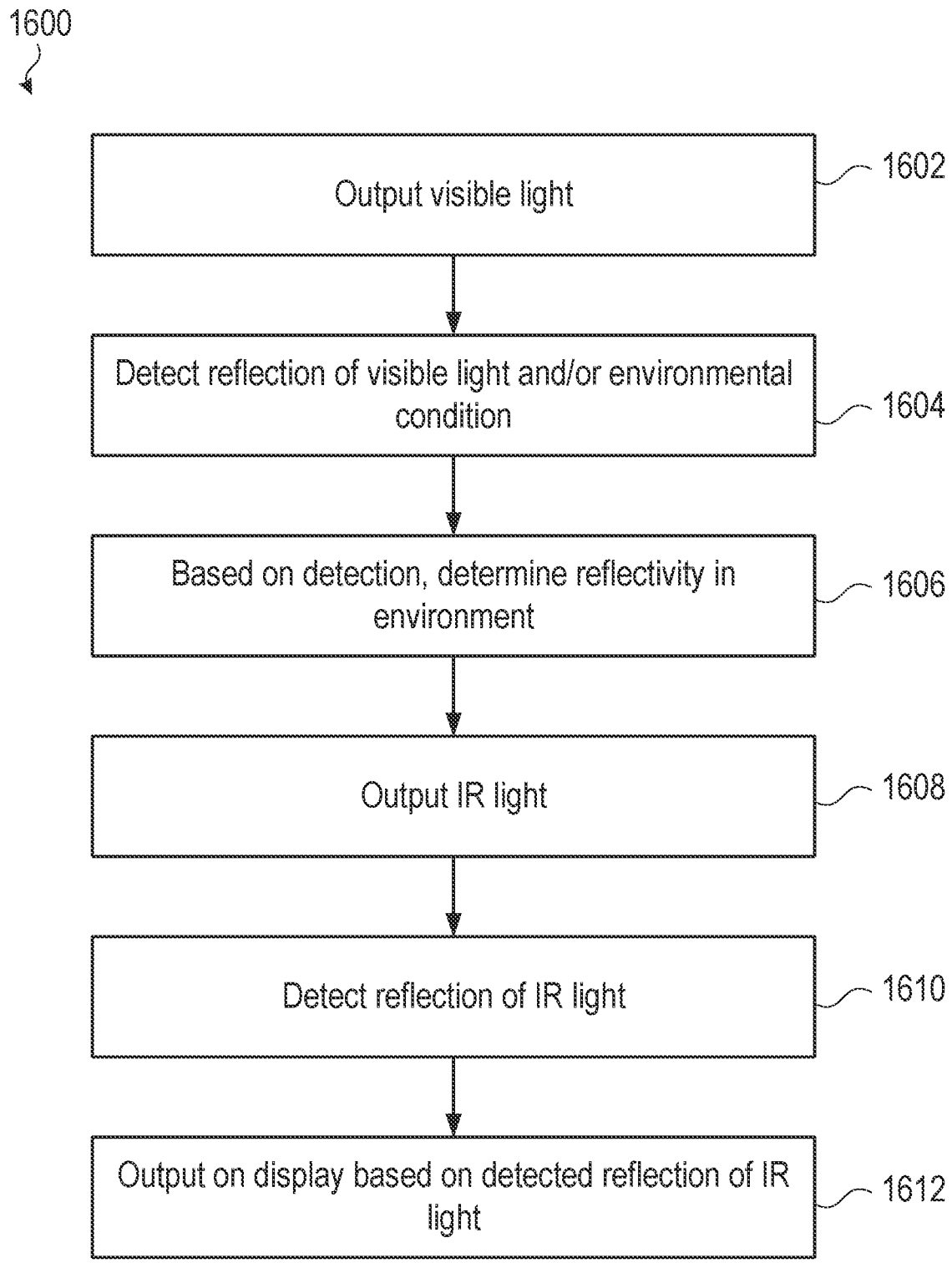
FIG. 16 illustrates a flow chart of example operations that may be performed by a light system of a vehicle in accordance with implementations of the subject technology.

FIG. 16 illustrates a flow diagram of an example process 1600 that may be performed by a light output system of a vehicle, in accordance with implementations of the subject technology. For explanatory purposes, the process 1600 is primarily described herein with reference to the vehicle 102 and components thereof as shown in FIGS. 1-14. However, the process 1600 is not limited to the vehicle 102 of FIGS. 1-14, and one or more blocks (or operations) of the process 1600 may be performed by one or more other components of other suitable apparatuses, devices, or systems. Further for explanatory purposes, some of the blocks of the process 1600 are described herein as occurring in serial, or linearly. However, multiple blocks of the process 1600 may occur in parallel. In addition, the blocks of the process 1600 need not be performed in the order shown and/or one or more blocks of the process 1600 need not be performed and/or can be replaced by other operations.

As illustrated in FIG. 16, at block 1602, a light output system (e.g., ECU 204) of a vehicle (e.g., vehicle 102) may output light. The light can be within the visible spectrum, such as white light. Non-limiting examples of such outputs are illustrated in FIGS. 4-5, 7-9, 11, and 13, which can optionally be combined to be performed simultaneously and/or in sequence as described herein.

At block 1604, a reflection of the visible light can be detected. Such a detection can be performed by one or more image sensors of the vehicle. Additionally or alternatively, an environmental condition can be detected, such as a detection of smoke, fog, and/or dust. Such a detection can be performed by an environmental sensor, such as a moisture sensor.

At block 1606, the light output system can determine a reflectivity in the environment. For example, the light output system can determine that the visible light is being reflected excessively based on the detected conditions. A range of visibility can be inferred from such detections. It can further be determined that the excessive reflection of visible light and/or a limited range of visibility can be undesirable to a user and/or that an alternative output based on light that is outside the visible spectrum can be beneficial.

At block 1608, the light output system may output additional light. The additional light can be outside the visible spectrum, such as infrared light. Optionally, the light within the visible spectrum can be reduced or eliminated.

At block 1610, a reflection of the infrared light can be detected. Such a detection can be performed by one or more image sensors of the vehicle.

At block 1612, the light output system can provide an output on a display. The output can be part of a user interface and be based on the detection of the reflected light. For example, the output can include a view captured by the one or more image sensors of the vehicle. Non-limiting examples of such outputs are illustrated in FIGS. 10, 12, and 14.

Figure 17:
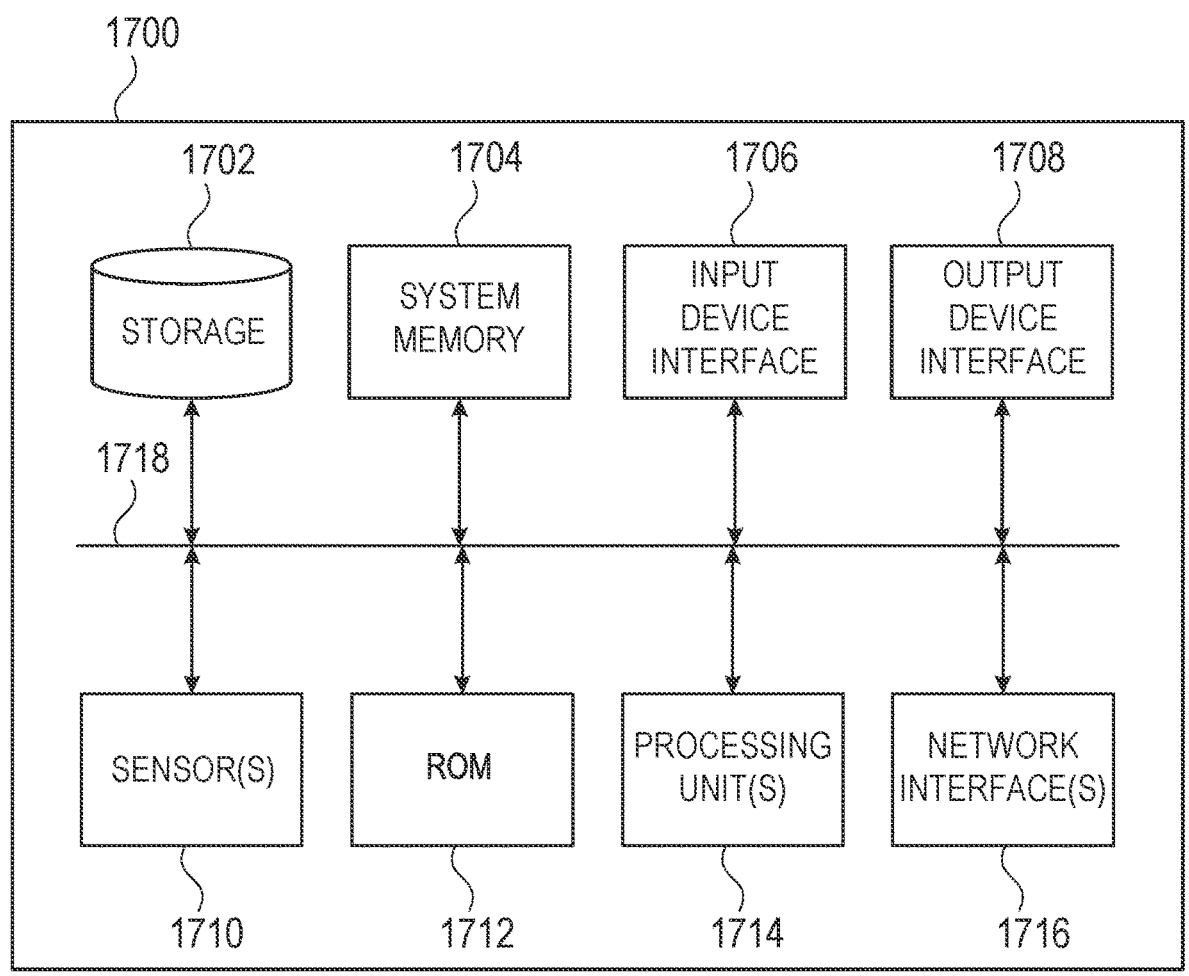
FIG. 17 illustrates an electronic system with which one or more implementations of the subject technology may be implemented.

FIG. 17 illustrates an example electronic system 1700 with which aspects of the present disclosure may be implemented. The electronic system 1700 can be, and/or can be a part of, any electronic device for providing the features and performing processes described in reference to FIGS. 1-16, including but not limited to a vehicle, computer, server, smartphone, and wearable device. The electronic system 1700 may include various types of computer-readable media and interfaces for various other types of computer-readable media. The electronic system 1700 includes a persistent storage device 1702, system memory 1704 (and/or buffer), input device interface 1706, output device interface 1708, sensor(s) 1710, ROM 1712, processing unit(s) 1714, network interface 1716, bus 1718, and/or subsets and variations thereof.

The bus 1718 collectively represents all system, peripheral, and chipset buses that communicatively connect the numerous internal devices and/or components of the electronic system 1700, such as any of the components of the vehicle 102 discussed above with respect to FIG. 2. In one or more implementations, the bus 1718 communicatively connects the one or more processing unit(s) 1714 with the ROM 1712, the system memory 1704, and the persistent storage device 1702. From these various memory units, the one or more processing unit(s) 1714 retrieves instructions to execute and data to process in order to execute the processes of the subject disclosure. The one or more processing unit(s) 1714 can be a single processor or a multi-core processor in different implementations. In one or more implementations, one or more of the processing unit(s) 1714 may be included on an ECU 204, such as in the form of the processor 206.

The ROM 1712 stores static data and instructions that are needed by the one or more processing unit(s) 1714 and other modules of the electronic system 1700. The persistent storage device 1702, on the other hand, may be a read-and-write memory device. The persistent storage device 1702 may be a non-volatile memory unit that stores instructions and data even when the electronic system 1700 is off. In one or more implementations, a mass-storage device (such as a magnetic or optical disk and its corresponding disk drive) may be used as the persistent storage device 1702.

In one or more implementations, a removable storage device (such as a floppy disk, flash drive, and its corresponding disk drive) may be used as the persistent storage device 1702. Like the persistent storage device 1702, the system memory 1704 may be a read-and-write memory device. However, unlike the persistent storage device 1702, the system memory 1704 may be a volatile read-and-write memory, such as RAM. The system memory 1704 may store any of the instructions and data that one or more processing unit(s) 1714 may need at runtime. In one or more implementations, the processes of the subject disclosure are stored in the system memory 1704, the persistent storage device 1702, and/or the ROM 1712. From these various memory units, the one or more processing unit(s) 1714 retrieves instructions to execute and data to process in order to execute the processes of one or more implementations.

The persistent storage device 1702 and/or the system memory 1704 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 1718 also connects to the input device interfaces 1706 and output device interfaces 1708. The input device interface 1706 enables a user to communicate information and select commands to the electronic system 1700. Input devices that may be used with the input device interface 1706 may include, for example, alphanumeric keyboards, touch screens, and pointing devices. The output device interface 1708 may enable the electronic system 1700 to communicate information to users. For example, the output device interface 1708 may provide the display of images generated by electronic system 1700. Output devices that may be used with the output device interface 1708 may include, for example, speakers, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 1718 also connects to sensor(s) 1710. The sensor(s) 1710 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 1710 may be utilized to detect movement, travel, and orientation of the electronic system 1700. For example, the sensor(s) may include an accelerometer, a rate gyroscope, and/or other motion-based sensor(s). The sensor(s) 1710 may include one or more biometric sensors and/or image sensors for authenticating a user.

The bus 1718 also couples the electronic system 1700 to one or more networks and/or to one or more network nodes through the one or more network interface(s) 1716. In this manner, the electronic system 1700 can be a part of a network of computers (such as a local area network or a wide area network). Any or all components of the electronic system 1700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM. CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A component for a movable apparatus, the component comprising:
   a first light source configured to produce visible light;
   a second light source configured to produce infrared light; and
   a reflector positioned to direct the visible light from the first light source and the infrared light from the second light source, wherein the first light source and the second light source are arranged to direct the visible light and the infrared light at a same portion of the reflector.

2. The component of claim 1, wherein the second light source is configured to produce the infrared light with at least a portion of the infrared light extending outside a beam spread angle of the visible light produced by the first light source.

3. The component of claim 1, further comprising:
   a heatsink supporting the first light source and the second light source; and
   a window, wherein the heatsink and the window at least partially enclose the first light source, the second light source, and the reflector.

4. A vehicle comprising:
   the component of claim 1;
   an image sensor configured to detect a reflection of the visible light or the infrared light; and
   a display configured to provide an output based on the detection of the reflection.

5. A component for a movable apparatus, the component comprising:
   a first light source configured to produce first light with a first beam spread angle; and
   a second light source comprising a laser configured to produce second light with a second beam spread angle, less than the first beam spread angle.

6. The component of claim 5, wherein the first beam spread angle is greater than 60 degrees, the second beam spread angle is less than 5 degrees, and the first light and the second light are visible light.

7. The component of claim 5, further comprising:
   a heatsink supporting the first light source and the laser;
   a window, wherein the heatsink and the window at least partially enclose the first light source and the second light source; and
   a reflector between the heatsink and the window, wherein the reflector is positioned to direct the first light to have the first beam spread angle as the first light is reflected from the reflector and the second light to have the second beam spread angle as the second light is reflected from the reflector.

8. A vehicle comprising:
   the component of claim 5;
   an image sensor configured to detect a reflection of the first light or the second light; and
   a display configured to provide an output based on the detection of the reflection.

9. A method of operating a movable apparatus, the method comprising:
   causing, by a processor and in a first mode, a first light source to produce visible light and a second light source to be inactive;
   causing, by the processor and in a second mode:
      the first light source to be inactive;
      the second light source to produce infrared light;
      an image sensor to capture a view and detect a reflection from the infrared light; and
      a display to provide, with the visible light, an output based on the detection of the reflection and comprising the view captured by the image sensor.

10. The method of claim 9, further comprising:
causing, by the processor, the image sensor to detect a range of visibility in a direction in front of the first light source based on the reflection; and
causing, by the processor, the second light source and the display in response to the detection of the range of visibility.

11. The method of claim 9, further comprising:
an environmental sensor to detect a moisture level in a vicinity of the first light source and the second light source; and
causing, by the processor, the second light source and the display in response to the detection of the moisture level.

12. The method of claim 9, further comprising:
detecting, by the processor, a location of an object reflecting the infrared light; and
causing, by the processor, the display to output a notification based on the detection of the object.

13. The method of claim 9, further comprising:
causing, by the processor, the image sensor to detect a motion of an object based on the reflection of the infrared light; and
outputting, by the processor, a notification based on the detection of the motion.

14. The method of claim 13, wherein outputting the notification comprises causing, by the processor, the first light source to produce the visible light.

15. The method of claim 13, wherein outputting the notification comprises transmitting, by the processor, a signal to an external device in operable communication with the movable apparatus.

16. The method of claim 13, wherein outputting the notification comprises causing, by the processor, a speaker to produce an audible output in response to the detection of the motion.

17. The method of claim 9, further comprising:
causing, by the processor and in a second third mode, the first light source to produce the visible light, the second light source to produce the infrared light, and the display to provide the output based on the detection of the reflection of the infrared light.

18. The method of claim 9, further comprising:
detecting, by the processor, an object based on the detection of the reflection of the infrared light; and
causing, by the processor, the display to provide the output including an indication of the object.

19. The method of claim 18, wherein the second light source is configured to produce the infrared light with at least a portion of the infrared light extending outside a beam spread angle of the visible light.

* * * * *

UNITED STATES PATENT AND TRADEMARK OFFICE
CERTIFICATE OF CORRECTION

PATENT NO. : 12,139,061 B2
APPLICATION NO. : 18/187598
DATED : November 12, 2024
INVENTOR(S) : Simon Baker et al.

Page 1 of 1

It is certified that error appears in the above-identified patent and that said Letters Patent is hereby corrected as shown below:

In the Claims

Column 23; Line 9 (Claim 11): Replace "an environmental" with --causing, by the processor, an environmental--;

Column 24; Line 13 (Claim 17): Replace "a second third mode" with --a third mode--.

Signed and Sealed this
Eleventh Day of February, 2025

Coke Morgan Stewart
*Acting Director of the United States Patent and Trademark Office*